US006935168B2

(12) United States Patent
Shimoyama

(10) Patent No.: US 6,935,168 B2
(45) Date of Patent: Aug. 30, 2005

(54) STROKE DETERMINATION METHOD OF FOUR CYCLE INTERNAL COMBUSTION ENGINE AND DEVICE THEREOF

(75) Inventor: Akira Shimoyama, Numazu (JP)

(73) Assignee: Kokusan Denki Co., Ltd., Shizuoka-Ken (JP)

( * ) Notice: Subject to any disclaimer, the term of this patent is extended or adjusted under 35 U.S.C. 154(b) by 412 days.

(21) Appl. No.: 10/146,445

(22) Filed: May 14, 2002

(65) Prior Publication Data

US 2002/0170346 A1 Nov. 21, 2002

(51) Int. Cl.[7] .............................................. G01M 15/00
(52) U.S. Cl. ..................................................... 73/117.3
(58) Field of Search ............................... 73/116, 117.2, 73/117.3, 118.1; 701/29, 99, 101

(56) References Cited

U.S. PATENT DOCUMENTS

| | | | | |
|---|---|---|---|---|
| 4,765,306 A | | 8/1988 | Scarnera et al. | |
| 5,970,784 A | * | 10/1999 | Genin | 73/117.3 |
| 6,170,322 B1 | * | 1/2001 | Yamazaki et al. | 73/117.3 |
| 6,340,020 B2 | * | 1/2002 | Yamazaki et al. | 123/478 |
| 6,378,358 B1 | | 4/2002 | Hirakata et al. | |
| 6,494,086 B1 | * | 12/2002 | Ponti | 73/116 |
| 6,550,452 B2 | * | 4/2003 | Schneider | 123/436 |
| 6,598,469 B2 | * | 7/2003 | Shimoyama et al. | 73/117.3 |
| 6,600,322 B1 | * | 7/2003 | Nussbaum | 324/380 |
| 2002/0026825 A1 | * | 3/2002 | Namari | 73/116 |
| 2003/0061870 A1 | * | 4/2003 | Lodise et al. | 73/117.3 |

FOREIGN PATENT DOCUMENTS

| | | |
|---|---|---|
| JP | 10-227252 | 8/1998 |
| JP | 2003-337206 | 12/2000 |
| JP | 2001-207902 | 8/2001 |

* cited by examiner

*Primary Examiner*—Eric S. McCall
(74) *Attorney, Agent, or Firm*—Pearne & Gordon, LLP

(57) ABSTRACT

A section where a piston of a four cycle internal combustion engine makes one rotation from a position reaching a top dead point to a next top dead point is taken as a determination object section, and an output of a pressure sensor for detecting an intake air pressure of the internal combustion engine is sampled. A maximum value of an inclination of a change in the intake air pressure in the process of increasing an absolute value of the intake air pressure sampled in each determination object section is found and, when the maximum value of the inclination of the change in the intake air pressure found in each determination object section is larger than the maximum value of the inclination of the change in the intake air pressure found in the determination object section which is one section before each determination object section, each determination object section is determined to be a section where the intake stroke and the compression stroke are performed.

34 Claims, 5 Drawing Sheets

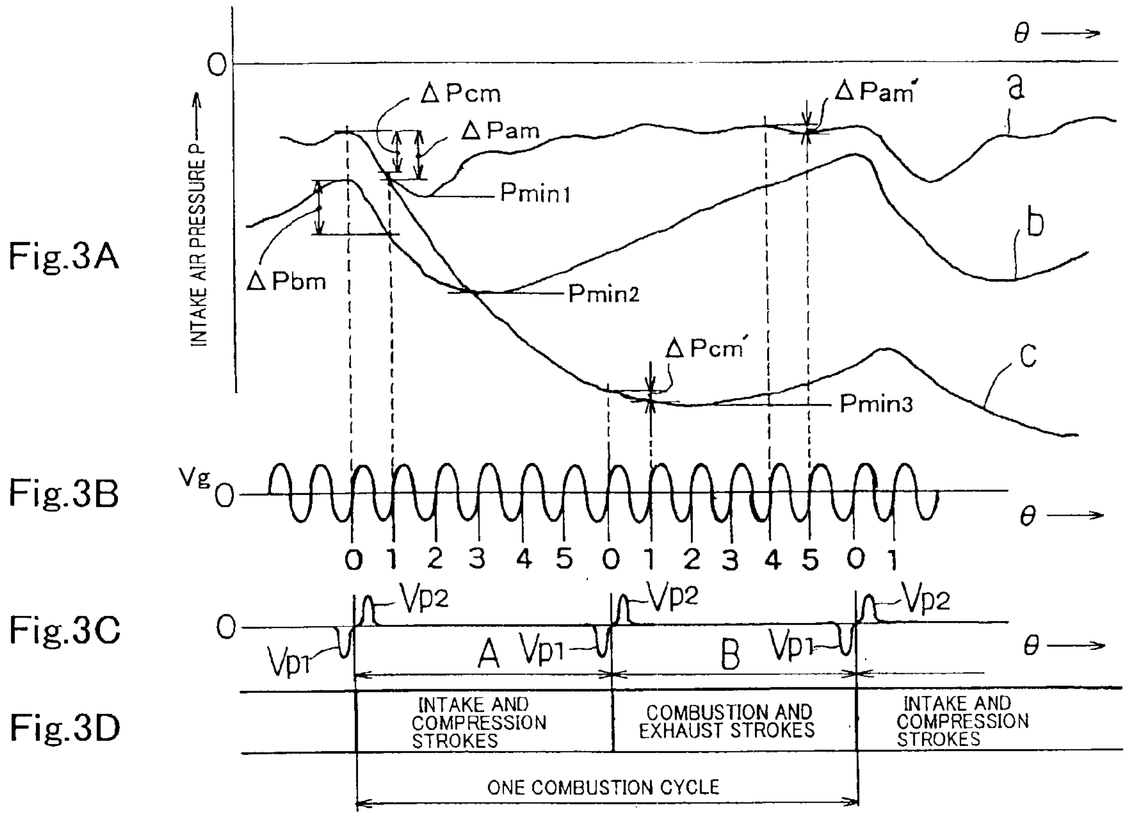
Fig.3A
Fig.3B
Fig.3C
Fig.3D
INTAKE AIR PRESSURE P
θ
0
ΔPcm
ΔPam
ΔPam'
ΔPbm
Pmin1
Pmin2
ΔPcm'
Pmin3
a
b
c
Vg
0 1 2 3 4 5 0 1 2 3 4 5 0 1
Vp2
Vp1
A
B
INTAKE AND COMPRESSION STROKES
COMBUSTION AND EXHAUST STROKES
INTAKE AND COMPRESSION STROKES
ONE COMBUSTION CYCLE
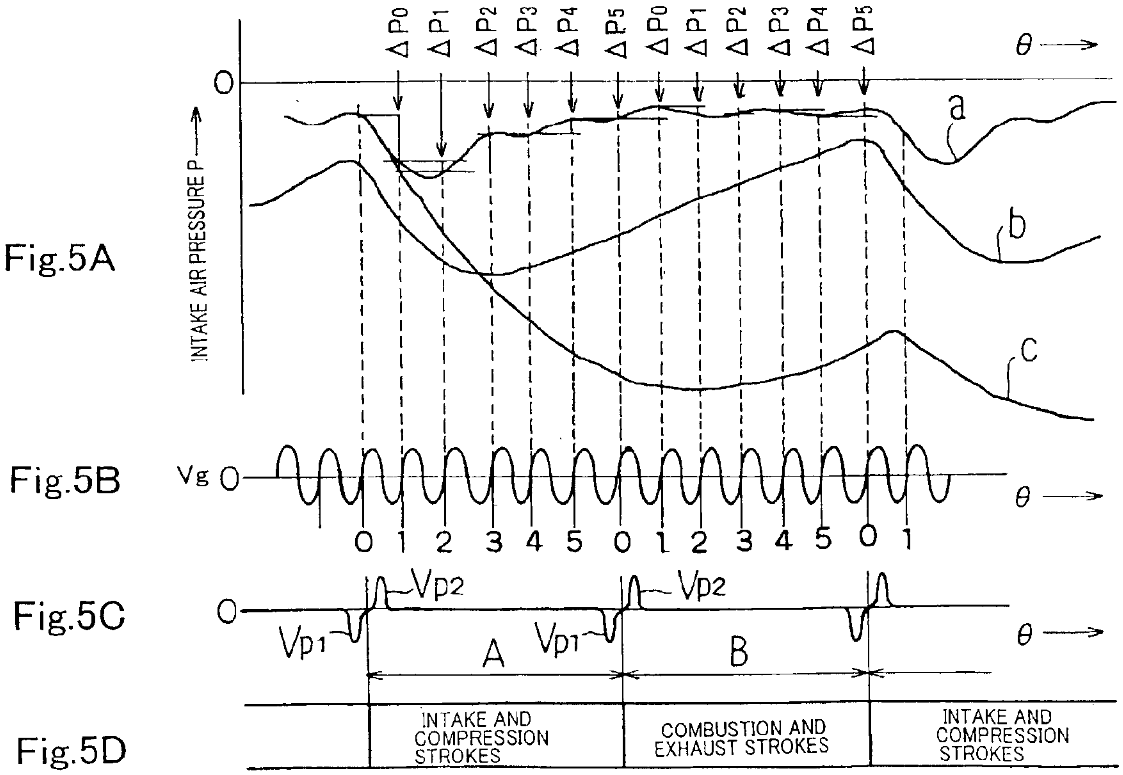
Fig.5A
Fig.5B
Fig.5C
Fig.5D
ΔP0 ΔP1 ΔP2 ΔP3 ΔP4 ΔP5 ΔP0 ΔP1 ΔP2 ΔP3 ΔP4 ΔP5
θ
0
INTAKE AIR PRESSURE P
a
b
c
Vg
0 1 2 3 4 5 0 1 2 3 4 5 0 1
Vp2
Vp1
A
B
INTAKE AND COMPRESSION STROKES
COMBUSTION AND EXHAUST STROKES
INTAKE AND COMPRESSION STROKES

STROKE DETERMINATION METHOD OF FOUR CYCLE INTERNAL COMBUSTION ENGINE AND DEVICE THEREOF

TECHNICAL FIELD OF THE INVENTION

The present invention relates to a stroke determination method for determining a stroke of a four cycle internal combustion engine and a stroke determination device used for implementing the method thereof.

BACKGROUND OF THE INVENTION

As means for supplying fuel to an internal combustion engine, a fuel injection device (EFI) is employed, which comprises an injector (electromagnetic fuel injection valve), a fuel pump to feed fuel to the injector, an electronic type controller (ECU) for generating an injection command signal at a predetermined fuel injection timing and an injector driving circuit to feed a driving current to the injector when the injection command signal is given.

When, for example, the fuel is injected into the inside of an intake pipe of the combustion engine by using this fuel injection device, in order to effectively feed the injected fuel into the inside of a cylinder, it is desirable to inject the fuel in the vicinity of an intake stroke of the engine. In order to inject the fuel in the vicinity of the intake stroke, it is necessary to detect the intake stroke. However, in the case of the four cycle internal combustion engine, since one combustion cycle is performed during two rotations of a crank shaft, it is not possible to determine the intake stroke just by detecting a rotational angle of the crank shaft.

For this reason, hitherto in the past, a cam shaft which makes one rotation per one combustion cycle has been attached with a cam shaft sensor which generates a reference signal having a pulse waveform only once for one combustion cycle and, at the same time, attached with a crank shaft sensor for generating a pulse for positional detection every time the crank shaft makes a unit angle rotation, thereby specifying the pulse for each positional detection generated by the crank shaft sensor based on the reference signal generated by the cam shaft sensor, so that it was determined in which stroke the combustion engine was in the rotational angle position of the crank shaft to be detected by each pulse for positional detection.

However, when this method was adopted, it was necessary to attach a sensor to generate a pulse signal for both of the crank shaft and the cam shaft and, therefore, there arose a problem of the cost thereof becoming expensive.

Hence, as shown in Japanese Patent Application Laid-Open Publication No. 10-227252 (227252/1998), there has been proposed a method, wherein a crank shaft sensor for generating a rotational angle detection pulse every time when the crank shaft makes a predetermined angle rotation is attached to the crank shaft and a pressure sensor for detecting the intake air pressure corresponding to a specified cylinder is provided, and the intake air pressure (pressure inside the intake pipe, which is usually negative pressure) detected when the rotational angle detection pulse was generated at a reference rotational angle position on which the crank shaft sensor was set at a specified rotational angle position is compared with the intake air pressure detected at the same position as one rotation before, so that the determination of the stroke of the four cycle internal combustion engine is performed.

According to the method previously proposed as described above, since there is no need to attach the cam shaft sensor, it is possible to perform the stroke determination without an increase in the cost.

Nevertheless, when a throttle valve is sufficiently opened and the combustion engine is operated in a state of a large volume of air always flowing into the inside of the intake pipe, an intake air pressure minutely pulsates due to a large volume of air flow and, therefore, there occurred a problem that it is not possible to adequately perform the determination of the stroke since the difference between the intake air pressure detected at a generating position of the rotational angle detection pulse of this time and the intake air pressure detected at the same position as the last time cannot be accurately distinguished or a magnitude relationship of the intake air pressure is reversed.

SUMMARY OF THE INVENTION

Accordingly, the object of the present invention is to provide a stroke determination method and a stroke determination device used for implementing the stroke determination method, wherein it is determined whether each section of one rotation of a four cycle internal combustion engine is a section in which an intake stroke and a compression stroke are performed or a section in which a combustion stroke and an exhaust stroke are performed without using any cam shaft sensor.

The stroke determination method according to the present invention is a method, wherein a section in which a crank shaft of the four cycle internal combustion engine makes one rotation from a position corresponding to a top dead center of a piston of a specified cylinder is taken as a determination object section and each determination object section is determined whether it is a section in which the intake stroke and the compression stroke are performed at the above described specified cylinder or a section in which the combustion stroke and the exhaust stroke are performed.

The present inventor has found that, in the case of the four cycle internal combustion engine, inclination of the change in the intake air pressure in the section of one rotation where the intake stroke and the compression stroke are performed becomes infallibly larger than the value in the section of one rotation where the combustion stroke and the exhaust stroke are performed. The present invention aims at these points, thereby performing the determination of the stroke of the four cycle internal combustion engine.

That is, the stroke determination method of the present invention detects the intake air pressure of the internal combustion engine in which the stroke change to be performed by a specified cylinder is reflected and finds the reflected amount of the magnitude of a determination object variable in each determination object section as a determination object value with the amount including information of the inclination of the change in the intake air pressure taken as the determination object variable. When the determination object value found in each determination object section is larger than the determination object value found in the determination object section which is one section before each determination object section, each determination objection section is determined to be the section where the intake stroke and the compression stroke are performed at the specified cylinder (the determination object section which is one section before each determination object section and the next determination object section are the section where the combustion and exhaust strokes are performed).

The inclination of the change in the above described intake air pressure may be the inclination of the change of the intake air pressure for the crank angle, which is a rate of change of the intake air pressure per unit crank angle, or may be the inclination of the change of the intake air pressure for the time, which is a rate of change of the intake air pressure per unit hour.

The above described "amount including the information of the inclination of the change in the intake air pressure"

may be the inclination of the intake air pressure (rate of change) itself or the amount corresponding to the inclination of the intake air pressure. For example, when the output of the pressure sensor is sampled at predetermined time intervals or predetermined angle intervals to detect the intake air pressure, the difference (which takes a positive or negative character) between the sampling value of the last time and the sampling value of this time can be used as the amount including the information of the inclination of the change in the intake air pressure.

When the difference between the sampling value of the last time and the sampling value of this time is taken as the determination object variable, the sign of the determination object variable differs depending on whether the sampling value of this time is subtracted from the sampling value of the last time or the sampling value of the last time is subtracted from the sampling value of this time when the difference between the sampling value of the last time and the sampling value of this time of the intake air pressure is found. In the present invention, when the difference between the sampling value of the last time and the sampling value of this time of the intake air pressure is taken as the determination object variable, an arithmetical operation of the determination object variable may be performed by any of the methods as described above.

The determination object variable including the information of the inclination of the change in the above described intake air pressure may be the inclination itself of the change in the intake air pressure, or an amount of change per unit hour of the intake air pressure or an amount of change in the intake air pressure generated while the crank angle makes a unit angle rotation.

As for the above described determination object value, it is desirable to use, for example, the determination object variable at the time when the inclination of the change in the intake air pressure becomes the maximum in the process of the absolute value of the intake air pressure (negative pressure) being increased in each determination object section.

When the four cycle internal combustion engine is in a state of operating the combustion engine with the throttle valve sufficiently opened, a minute pulsation is generated in the intake air pressure. Even in such a state, in the section where the intake stroke and the compression stroke are performed, the maximum value of the inclination of the change in the intake air pressure generated in the process of the absolute value of the intake air pressure being increased becomes infallibly larger than the value in the section where the combustion stroke and the exhaust stroke are performed.

Accordingly, as described above, in the case where, with the amount including the information of the inclination of the change in the intake air pressure taken as the determination object variable, the value of the determination object variable at the time when the magnitude of the inclination of the intake air pressure in each determination object section becomes the maximum is found as the determination object value, each determination object section can be reliably determined to be the section where the intake stroke and the compression stroke are performed at the specified cylinder when the determination object value found in each determination object section is larger than the determination object value found in the determination object section which is one section before each determination object section.

Note that, in the four cycle internal combustion engine, regardless of an opening degree of the throttle valve, the minimum value (maximum value of the absolute value of the intake negative pressure) of the intake air pressure in the section of one rotation where the intake stroke and the compression stroke are performed becomes infallibly smaller than the minimum value of the intake air pressure in the section of one rotation where the combustion stroke and the exhaust stroke are performed and, therefore, it is possible to perform the stroke determination even by detecting the minimum value of the intake air pressure in each determination object section.

However, in the case where the throttle valve is suddenly closed from a fully opened state at high-speed rotation time of the internal combustion engine, a crank angle position showing the minimum value of the intake air pressure has a tendency of shifting to the determination object section side where the combustion stroke and the exhaust stroke are performed and, therefore, when the determination of the stroke is performed from the minimum value of the intake air pressure in each determination object section, the minimum value of the determination object variable in the section where the combustion stroke and the exhaust stroke are performed becomes smaller than the minimum value of the determination object variable in the section where the intake stroke and the compression stroke are performed and there arises a possibility that the determination of the stroke cannot be adequately performed.

In contrast, in the case of the four cycle internal combustion engine, the inclination of the change in the intake air pressure generated in the process of the absolute value of the intake air pressure (negative pressure) being increased becomes infallibly the maximum in the section where the intake stroke and the compression stroke are performed and, therefore, when, as described above, the inclination of the change in the intake air pressure generated in the process of the absolute value of the intake air pressure being increased is detected so as to perform the determination of the stroke, the stroke determination can be adequately performed even at a sudden deceleration of the combustion engine.

The above described determination method aims at the maximum value of the inclination of the change in the intake air pressure generated in the process of the absolute value of the intake air pressure being increased in each determination object section so that the determination of the stroke is performed, while, in the case of the four cycle internal combustion engine, since a cumulative value or an average value of the inclination of the intake air pressure in the determination object section where the intake stroke and the compression stroke are performed becomes infallibly larger than the value in the determination object section where the combustion stroke and the exhaust stroke are performed, the determination of the stroke can be performed even by using the cumulative value or the average value of the inclination of the intake air pressure.

A stroke determination device to be used for implementing the above described stroke determination method is constituted such that it comprises: sample timing signal generating means for generating a sample timing signal plural times in each determination object section; a reference signal generator for generating a reference signal at a reference rotational angel position set at a specified rotational angle position of the crank shaft of the internal combustion engine; determination object section detection means for detecting each determination object section based on a generating position of the reference signal; intake air pressure sampling means for sampling the intake air pressure, in which the change in the stroke to be performed by a specified cylinder is reflected every time when the sample timing signal is generated, of the internal combustion engine; determination object variable maximum value arithmetical operation means for finding the absolute value of the difference between the intake air pressure sampled one time before and the intake air pressure sampled this time every time the intake air pressure is sampled as the determination object variable and finding the maximum value of the determination object variable in each determination object section as the determination object value; and determination means for determining each determination object section to be the section where the intake stroke and the compression stroke are performed at the above described specified cylinder when the determination object value found in each determination object section is larger than the determination object value found in the determination object section which is one section before each determination object section.

The stroke determination device according to the present invention can be further constituted such that it comprises: sample timing signal generating means for generating the sample timing signal plural times in each determination object section; a reference signal generator for generating a reference signal at a reference rotational angel position set at the specified rotational angle position of the crank shaft of the internal combustion engine; determination object section detection means for detecting each determination object section based on the generating position of the reference signal; intake air pressure sampling means for sampling the intake air pressure, in which the change in the stroke to be performed by the specified cylinder is reflected every time the sample timing signal is generated, of the internal combustion engine; determination object variable cumulative value arithmetical operation means for finding the difference between the intake air pressure sampled one time before and the intake air pressure sampled this time every time when the intake air pressure is sampled as the determination object variable and finding the cumulative value of the determination object variable found in each determination object section as the determination object value; and determination means for determining each determination object section to be the section where the intake stroke and the compression stroke are performed at the above described specified cylinder when the determination object value found in each determination object section is larger than the determination object value found in the determination objection section which is one section before each determination object section.

The stroke determination device according to the present invention can be further constituted such that it comprises: sample timing signal generating means for generating the sample timing signal plural times in each determination object section; the reference signal generator for generating the reference signal at the reference rotational angel position set at the specified rotational angle position of the crank shaft of the internal combustion engine; determination object section detection means for detecting each determination object section based on the generating position of the reference signal; intake air pressure sampling means for sampling the intake air pressure, in which the change in the stroke to be performed by the specified cylinder is reflected every time the sample timing signal is generated, of the above described internal combustion engine; determination object variable average value arithmetical operation means for finding the difference between the intake air pressure sampled one time before and the intake air pressure sampled this time every time when the intake air pressure is sampled as the determination object variable and finding the average value of the determination object variable found in each determination object section as the determination object value; and determination means for determining each determination object section to be the section where the intake stroke and the compression stroke are performed at the above described specified cylinder when the determination object value found in each determination object section is larger than the determination object value found in the determination objection section which is one section before each determination object section.

BRIEF DESCRIPTION OF THE DRAWINGS

The present invention can be better understood by the following description when considered in connection with the accompanying drawings; wherein:

FIG. 3A is a graph showing a change of an intake air pressure of the internal combustion engine to be detected in a first embodiment according to the present invention;

FIG. 3B is a waveform chart showing a waveform of a rotational angle detection signal to be used in the first embodiment according to the present invention;

FIG. 3C is a waveform chart showing a waveform of a reference signal to be used in the first embodiment according to the present invention;

FIG. 3D is a view showing a stroke of the combustion engine corresponding to each part of FIG. 3A to FIG. 3C;

FIG. 5A is a graph showing a change in an intake air pressure of an internal combustion engine to be detected in a second embodiment according to the present invention;

FIG. 5B is a waveform chart showing a waveform of a rotational angle detection signal to be used in the second embodiment according to the present invention;

FIG. 5C is a waveform chart showing a waveform of a reference signal to be used in the second embodiment according to the present invention;

FIG. 5D is a view showing a stroke of the combustion engine corresponding to each part of FIG. 5A to FIG. 5C.

DETAILED DESCRIPTION OF PREFERRED EMBODIMENTS

Hereinafter, embodiments of the present invention will be described with reference to the drawings.

Figure 1:
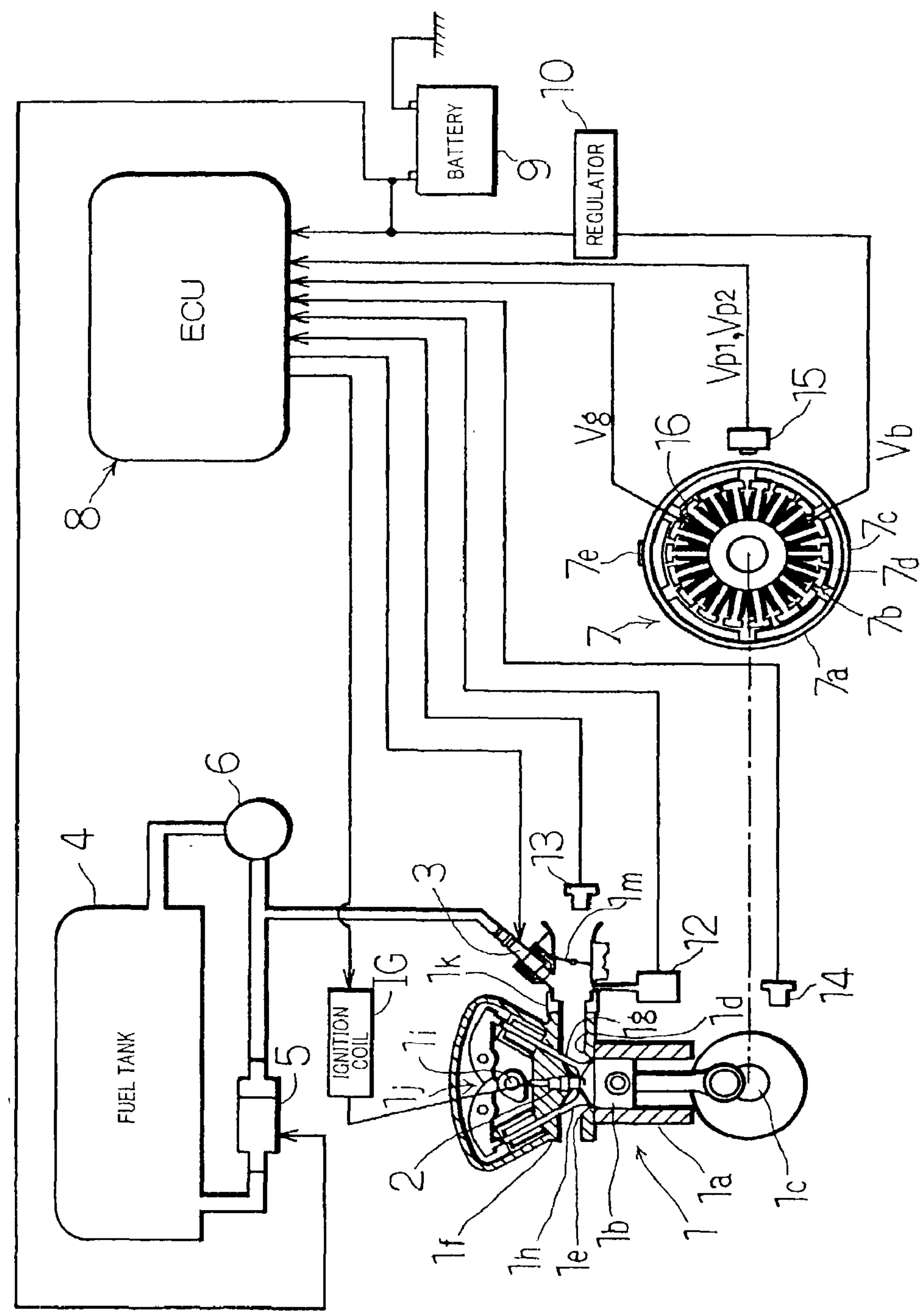
FIG. 1 is a schematic diagram showing a constitutional example of a system which controls an internal combustion engine by an ECU.

FIG. 1 is a schematic diagram showing a constitutional example of a system which controls an internal combustion engine by an ECU. The illustrated internal combustion engine 1 is a four cycle combustion engine having a single cylinder and comprises a cylinder 1*a*, a piston 1*b*, a crank shaft 1*c* linked with the piston 1*b* through a connecting rod, a cylinder head If having an intake port 1*d* and an exhaust port 1*e*, an intake valve 1*g* and an exhaust valve 1*h* which opens and closes the intake port and the exhaust port, respectively, a cam shaft 1*i* which is driven by the crank shaft 1*c*, a valve driving mechanism 1*j* which drives the intake valve 1*g* and the exhaust valve 1*h* followed by the rotation of the cam shaft 1*i* and an intake pipe 1*k* which is connected to the intake port 1*d*, and the inside of the intake pipe 1*k* is provided with a throttle valve 1*m*.

The cylinder head of the internal combustion engine 1 is attached with an ignition plug 2, and the ignition plug 2 is connected to a secondary coil of an ignition coil IG through a high tension cord.

The intake pipe 1*k* of the internal combustion engine is attached with an injector (electromagnetic fuel injection device) 3. The illustrated injector 3 has a fuel injection port at a top end and is a known type comprising an injector body having a fuel supply port close to a rear end portion, a valve member provided so as to be displaceable between an opening position (open position) to open the fuel injection port and a closing position (close position) inside the injector body, energizing means for energizing the valve member always toward the close position side and a solenoid which drives the valve member toward the open position, and while a driving current is given to the solenoid, it opens the fuel injection port so as to inject the fuel into the inside of the intake pipe of the internal combustion engine.

Reference numeral 4 denotes a fuel tank for storing the fuel which is supplied to the combustion engine, 5 denotes a motor-driven fuel pump for supplying the fuel inside of the fuel tank 4 to the injector 3, and 6 denotes a pressure regulator connected to a pipe conduit joining to the fuel supply port of the injector 3. The pressure regulator 6 returns a part of the fuel to be supplied from the fuel pump 5 to the fuel tank 4 when fuel pressure given to the injector 3 exceeds a set value, so that the fuel pressure is regulated to approximately maintain a set value.

In this way, since the fuel pressure given to the injector 3 is approximately maintained at the set value, the amount of fuel to be injected (injected amount of fuel) from the injector 3 depends on a length of time during which the injection port of the injector 3 is opened. The length of time during which the injection port of the injector 3 is opened almost depends on a length of time during which the driving current is fed to the injector. Accordingly, when the injected amount of fuel is controlled, the injected amount of fuel required by the combustion engine is arithmetically operated according to various control conditions and an injection timing necessary for obtaining the injected amount of fuel is found so that the driving current is fed to the injector during the arithmetically operated injection timing when a predetermined injection timing is detected, thereby permitting the fuel injection to be performed.

Reference numeral 7 denotes a magneto generator to be driven by the crank shaft 1*c* of the combustion engine. The illustrated magneto generator comprises a magnet rotor 7*a* attached to the crank shaft 1*c* and a stator 7*b* fixed to the case or the like of the combustion engine. The illustrated magnet rotor 7*a* comprises a known type flywheel magnet rotor comprising a cup-shaped flywheel 7*c* attached to the crank shaft 1*c* and a plurality of permanent magnets 7*d* attached to the inner periphery of the flywheel. In the case of the illustrated example, six pieces of permanent magnets 7*d* are attached to the inner periphery of the flywheel, and these permanent magnets are magnetized into 12 poles.

The stator 7*b* comprises a multipolar star core with a number of teeth radially formed and a number of generating coils wound around a number of teeth of the core, and the magnetic pole portion of the top end of each tooth of the multipolar star core which constitutes the stator 7*b* is opposed to the magnetic pole portion of the magnetic rotor 7*a* through a predetermined gap.

Reference numeral 8 denotes an ECU for controlling the injected amount of fuel from the injector 3 and an ignition timing of the combustion engine, 9 denotes a battery which is charged through a regulator 10 by the output voltage Vb of the generating coils for charging a battery provided for the stator of the magneto generator 7. The output voltage of the battery 9 is fed to the power supply terminal of the motor-driven fuel pump 5 and the power supply terminal of the ECU 8. The inside of the ECU 8 is provided with a power supply circuit for adjusting the voltage of the battery to a constant voltage suitable for driving a microcomputer, and a power supply voltage is applied to the power supply terminal of the microcomputer from the power supply circuit.

The ECU 8 is inputted with control conditions for controlling the amount of fuel to be injected from the injector 3 and the outputs of various sensors for detecting the control conditions to control the ignition timing of the combustion engine.

The illustrated example is provided with a pressure sensor 12 for detecting the pressure inside the intake pipe 1*k* as the intake air pressure, an intake air temperature sensor 13 for detecting the intake air temperature of the combustion engine and a water temperature sensor 14 for detecting the temperature of the coolant of the combustion engine, and the outputs of these sensors are inputted to the A/D input port of the ECU 8.

A pulser 15 for generating a pulse is provided at the specified rotational angle position of the crank shaft, and the output of this pulser is inputted to the ECU 8. The pulser 15 generates the pulse by detecting the edge of a reluctor 7*e* comprising a projection or a concave portion formed on the outer periphery of the flywheel 7*c*. The pulser 15 is, for example, comprised of a core opposing to the reluctor 7*e* and having a magnetic pole portion at a top end, a permanent magnet magnetically coupled with the core and signal coils wound around the core.

The pulser 15 generates a pair of pulses having a different polarity, respectively, when it detects the front end edge of the rotational direction of the reluctor 7*e* and detects the rear end edge of the rotational direction of the reluctor 7*e*. This pulser 15 constitutes a reference signal generator, and the one pulse of the pair of the pulses generated by this pulser is used as a reference signal.

Here, as shown in FIG. 3C, when the pulser 15 detects the front end edge of the reluctor 7*e* and detects the rear end edge, a negative pulse Vp1 and a positive pulse Vp2 are assumed to be generated, respectively. Either one of these pulses Vp1 and Vp2 may be used as a reference signal. In this example, the negative pulse Vp1 is used as the reference signal, and the generating position (position in which the pulse Vp1 reaches a threshold level) of the pulse Vp1 is taken as a reference rotational angle position.

When the ECU 8 recognizes that the reference signal Vp1 is generated, it detects that the rotational angle position of the crank shaft of the combustion engine has matched the reference rotational angle position. Since the illustrated internal combustion engine is the four cycle combustion engine, the reference signal Vp1 is generated twice per one combustion cycle.

In the illustrated example, the generating coil wound around one tooth of the core of the stator of the magneto generator 7 is used as a rotational angle sensor 16, and the alternating voltage Vg having a sine waveform outputted by the generating coil constituting this rotational angle sensor is inputted to the ECU 8 as a rotational angle detection signal.

The inside of the ECU 8 is provided with an injector driving circuit and a primary current control circuit for controlling the primary current of the ignition coil IG, and the output terminal of the injector driving circuit and the output terminal of the primary current control circuit are connected with the injector 3 and the primary coil of the ignition coil IG, respectively.

The ECU 8 constitutes a stroke determination device for performing the determination of the stroke of the combustion engine together with the pulser (reference signal generator) 15, the rotational angle sensor 16 and the pressure sensor 12 in addition to constituting various functional realizing means necessary for controlling the injector 3 and the primary current of the ignition coil IG by permitting the microcomputer to implement a predetermined program.

Figure 2:
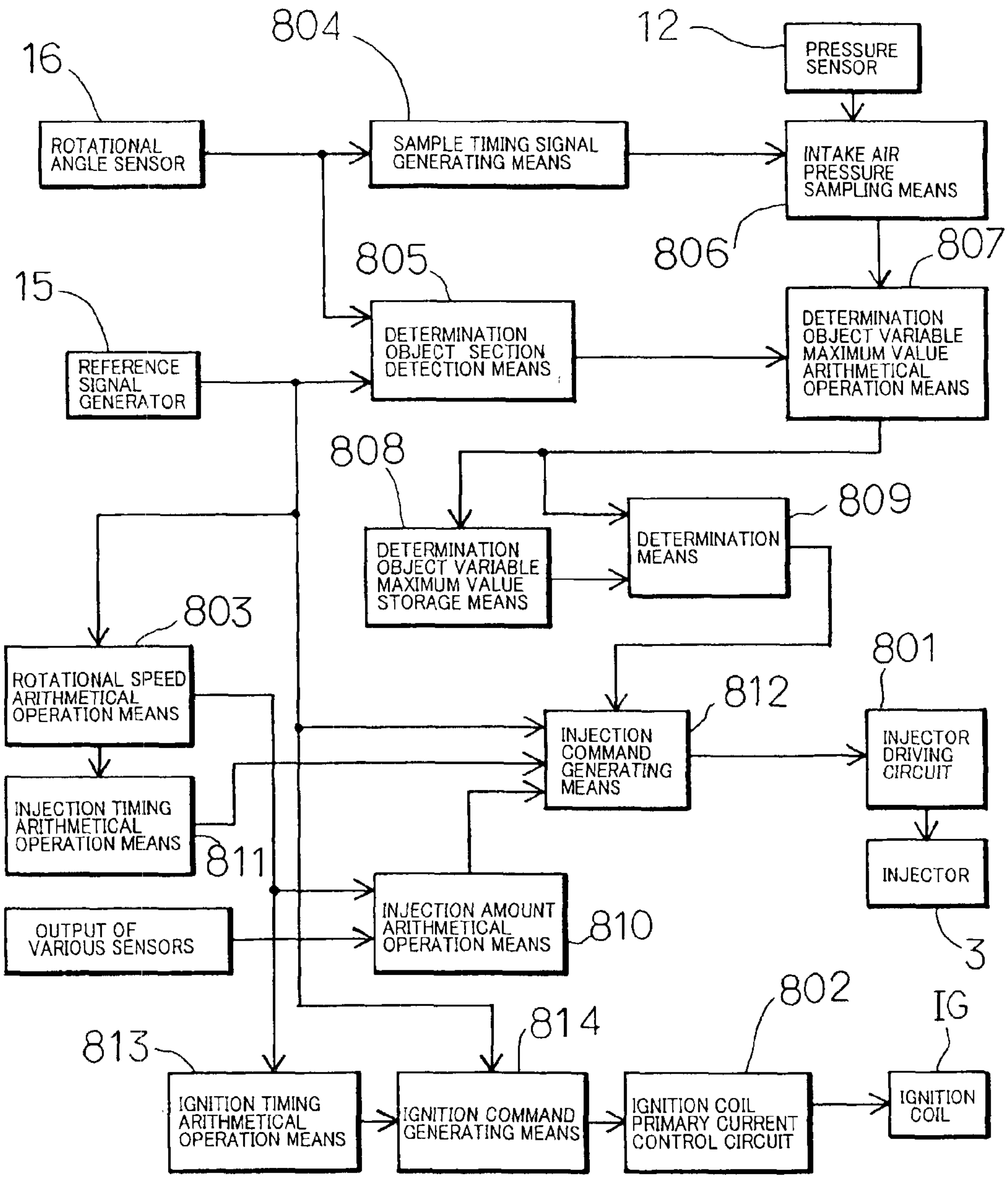
FIG. 2 is a block diagram showing a constitution of a stroke determination device according to the present invention.

FIG. 2 is a block diagram showing the constitution of hardware of the system shown in FIG. 1 and the constitution of various functional realizing means constituted of the microcomputer inside the ECU 8 and the program which the microcomputer implements.

In FIG. 2, reference numeral 801 denotes an injector driving circuit for supplying the driving current to the injector 3 and reference numeral 802 denotes a primary current control circuit for controlling the primary current of the ignition coil, and these circuits are provided as hardware circuits inside the ECU 8.

Reference numeral 804 denotes sample timing signal generating means for generating the sample timing signal which decides a timing to sample the output (intake air pressure) of the pressure sensor 12 plural times in each determination object section. The sample timing signal generating means 804 to be used in the present embodiment comprises a zero cross detection circuit for generating a sample timing signal having a pulse waveform when a zero cross point is detected, which is generated when the alternating voltage (rotational angle detection signal) Vg generated by the rotational angle sensor 16 moves from a negative half-wave to a positive half-wave. The other functional realizing means are comprised of the microcomputer inside the ECU 8 and the predetermined program implemented by the microcomputer.

Hereinafter, the stroke determination method and the device thereof according to the present invention and the constitutions of each portion of the FIG. 2 will be described.

First, the stroke determination method and the stroke determination device according to the present invention will be described.

FIG. 3 shows one example of the change of a crank angle θ for the intake air pressure P of the four cycle internal combustion engine, the waveform of the rotational angle detection signal Vg to be outputted by the rotational angle sensor 16 and the waveform of the pulse signal to be generated by the reference signal generator 15. In FIG. 3A, a curve a shows the intake air pressure P to be detected by the pressure sensor 12 when the combustion engine is operated in a state of the throttle valve 1*m* of the combustion engine being fully opened, and the curve b shows the change in the intake air pressure P when the combustion engine is put into an idling operation with the throttle valve closed (opening degree of the throttle valve put to the smallest). The curve c shows the change in the intake air pressure P when the throttle valve is suddenly closed from a fully opened state and the combustion engine is suddenly decelerated.

FIGS. 3B and 3C show the waveform of the rotational angle detection signal Vg generated by the rotational angle sensor 16 comprising generating coils provided inside the magneto generator 7 which is driven by the crank shaft of the combustion engine and the waveforms of the pulses Vp1, Vp2 generated by the reference signal generator 15, and FIG. 3D shows the stroke of the combustion engine.

As already described, the present embodiment uses the pulse signal Vp1 to be generated when the reference signal generator (the pulser 15) detects the front end edge of the rotational direction of the reluctor 7*e* as the reference signal.

As the sample timing of the intake air pressure, each zero cross point (hereinafter, referred to simply as zero cross point) at the time when the rotational angle detection signal generated by the rotational angle sensor 16 moves from the negative half-wave to the positive half-wave is used. In this example, since the rotor of the magneto generator 7 is comprised of 12 poles, the rotational angle detection signal Vg is generated by six cycles during one rotation which the crank shaft makes, and the six zero cross points of this rotational angle detection signal are used as the sample timing, respectively.

In the illustrated example, a reference position θo which is the generating position of the reference signal Vp1 is set immediately before the rotational angle position of the crank shaft when the piston of the combustion engine reaches the top dead point, and the reference signal generator 15 and the magneto generator 7 are provided such that the zero cross point of the rotational angle detection signal Vg which appears immediately after the reference signal Vp1 is generated matches the rotational angle position of the crank shaft when the piston of the combustion engine reaches the top dead point.

In order to specify each zero cross point (sampling position) of the rotational angle detection signal Vg, the present embodiment attaches an identification number 0 to the zero cross point of the rotational angle detection signal Vg which appears immediately after the generation of the reference signal Vp1 is detected, and subsequently attaches the identification numbers of 1 to 5 to the zero cross points to be used as the sampling positions. When the identification numbers are attached to the zero cross points of a series of the rotational angle detection signals in this way, the section from the zero cross point of each identification number 0 to the zero cross point of the next identification number 0 can be detected as a section (determination object section) where the crank shaft of the four cycle combustion engine makes one rotation from the position corresponding to the top dead point of the piston of the specified cylinder.

As shown in the curves a to c of FIG. 3A, in the four cycle internal combustion engine, the minimum value of the intake air pressure infallibly appears in the section of one rotation where the intake stroke and the compression stroke are performed. In FIG. 3A, Pmin1 shows the minimum value which appears when the intake air pressure shows a change such as the curve a with the throttle valve sufficiently opened, and Pmin2 and Pmin3 show the minimum value of the intake air pressure at the time when the intake air pressure shows a change such as the curve b with the combustion engine put into an idling operation as well as at the time when the intake air pressure shows a change such as the curve c with the combustion engine suddenly decelerated.

When the throttle valve is sufficiently opened, as shown in the curve a of FIG. 3A, a minute pulsation is observed in the intake air pressure. However, even in this case, the minimum value Pmin1 remarkably appears in the intake air pressure in the section of one rotation where the intake stroke and the compression stroke are performed. As can be seen in the curb b of FIG. 3A, even in the idling time of the combustion engine, the minimum value Pmin1 appears in the intake air pressure in the section of one rotation where the intake stroke and the compression stroke are performed.

In this way, at a normal operating state of the four cycle internal combustion engine, the determination object section where the minimum value of the intake air pressure appears can be determined to be the section where the intake stroke and the compression stroke are performed.

However, at the sudden deceleration time of the combustion engine, as shown in the curve c of FIG. 3A, since the rotational angle position of the crank shaft at the time when the minimum value Pmin3 appears is shifted to the section side where the combustion stroke and the exhaust stroke are performed, there is a risk of the determination of the stroke being not adequately performed if the method of observing the minimum value of the intake air pressure is adopted.

Hence, the present inventor has found through many experiments that, as a result of various studies of the change in the intake air pressure of the four cycle internal combustion engine, the change in the intake air pressure has the following characteristics at the normal operating state as well as at the sudden deceleration time.

(a) In the section of one rotation where the intake stroke and the compression stroke (hereinafter, referred to as intake and compression strokes) are performed, the inclination of the change in the intake air pressure in the process of the absolute value of the intake air pressure being increased infallibly becomes larger than the inclination of the change in the intake air pressure in the process of the intake air pressure being increased in the section of one rotation where the combustion stroke and the exhaust stroke (hereinafter, referred to as combustion and exhaust strokes) are performed.

(b) In the section of one rotation where the intake and compression strokes are performed, the cumulative value of the inclination of the change in the intake air pressure infallibly becomes larger than the cumulative value of the inclination of the change in the intake air pressure in the section of one rotation where the combustion and exhaust strokes are performed.

(c) In the section of one rotation where the intake and combustion strokes are performed, the average value of the inclination of the change in the intake air pressure infallibly becomes larger than the average value of the inclination of the change in the intake air pressure in the section of one rotation where the combustion and exhaust strokes are performed.

The method of the present invention performs the stroke determination of the combustion engine by aiming at the fact that there exist the above described characteristics (a) to (c) in the change in the intake air pressure. The preferred embodiment of the stroke determination method according to the present invention provides the sample timing signal generating means 804 for generating the sample timing signals plural times in each determination object section and the reference signal generator 15 for generating the reference signal at the reference rotational angle position set at the specified rotational angle position of the crank shaft of the internal combustion engine, and the intake air pressure, in which the change in the stroke to be performed by the specified cylinder is reflected, of the internal combustion engine is sampled every time the sample timing signal is generated (in the case of the illustrated example, every time the zero cross points denoted by the identification numbers 0 to 5 are detected), and each determination object section is detected based on the reference signal. Every time the intake air pressure is sampled, the difference between the intake air pressure sampled one time before and the intake air pressure sampled this time is found as the determination object variable so that the maximum value in each determination object section of the determination object variable at the time when the inclination of the intake air pressure is negative is found as the determination object value, and, when the above described determination object value found in each determination object section is larger than the determination object value found in the determination object section which is one section before each determination object section, each determination object section is determined to be the section where the intake stroke and the compression stroke are performed at the specified cylinder.

Now, when the combustion engine is taken as operated with the throttle valve sufficiently opened (for example, the throttle valve is put into a fully opened state), the intake air pressure changes as shown in the curve a of FIG. 3A. At this time, the determination object value "maximum value in each determination object section of the determination object variable (the difference between the intake air pressure sampled one time before and the intake air pressure sampled this time) at the time when the inclination of the intake air pressure is negative" in the section (the illustrated section A) of one rotation where the intake stroke and the compression stroke are performed is ΔPam, while the maximum value of the determination object value in the section where the combustion stroke and the exhaust stroke are performed is ΔPam' so that ΔPam>ΔPam'.

The change in the intake air pressure at the idling time of the combustion engine changes like the curve b̲ of FIG. 3A. However, at this time, the determination object value in the section A where the intake and compression strokes are performed is ΔPbm, while the inclination of the intake air pressure in the section B where the combustion and exhaust strokes are performed is always positive and, therefore, the determination object value is 0.

At the sudden deceleration time of the combustion engine, the intake air pressure changes like the curve c̲ of FIG. 3A. However, at this time, the determination object value in the section A where the intake and compression strokes are performed is ΔPcm, while the determination object value in the section B where the combustion and exhaust strokes are performed is ΔPcm' so that ΔPcm<ΔPcm'.

As described above, even in whichever state the combustion engine is placed, since the maximum value (the determination object value) of the inclination of the change in the intake air pressure in the process of the absolute value of the intake air pressure being increased in the section where the intake and compression strokes are performed becomes larger than the maximum value of the inclination of the change in the intake air pressure in the process of the absolute value of the intake air pressure being increased in the section where the combustion and exhaust strokes are performed, by comparing the above described determination object values found in each determination object section, it can be reliably determined whether each determination object section is the section where the intake and compression strokes are performed or the section where the combustion and exhaust strokes are performed.

In the example shown in FIG. 2, the stroke determination device for implementing the stroke determination method according to the present invention is comprised of the rotational angle sensor 16 for generating the rotational angle detection signal including the information of a plurality of different rotational angle positions of the crank shaft of the internal combustion engine not shown as the information of a plurality of sampling positions, respectively; the reference signal generator (pulser) 15 for generating the reference signal Vp1 at the reference rotational angle position set at the specified rotational angle position of the crank shaft of the internal combustion engine; the sample timing signal generating means 804 for detecting a plurality of zero cross points of the rotational angle detection signal in each determination object section and generating the sample timing signal every time each zero cross point is detected; determination objection section detection means 805 for detecting each determination object section based on the generating position of the reference signal Vp1; intake air pressure sampling means 806 for sampling the intake air pressure, in which the change in the stroke to be performed by the specified cylinder is reflected, of the internal combustion engine every time the sample timing signal is generated; determination object variable maximum value arithmetical operation means 807 for finding the absolute value of the difference between the intake air pressure sampled one time before and the intake air pressure sampled this time as the determination object variable every time the intake air pressure is sampled and finding the maximum value in each determination object section of the determination object variable at the time when the inclination of the change in the intake air pressure is negative as the determination object value; determination object value storage means 808 for storing the determination object value found by this arithmetical operation means 807; and determination means 809 for determining each determination object section as the section where the intake stroke and the compression stroke are performed at the specified cylinder when the determination object value in each determination object section found by the determination object variable maximum value arithmetical operation means is larger than the determination object value found in the determination object section which is one section before each determination object section.

As described above, the sample timing signal generating means 804 comprises the zero cross detection circuit and detects the zero cross point at the time when the rotational angle detection signal moves from the negative half-wave to the positive half-wave, thereby generating the sample timing signal at each zero cross point.

The determination object section detection means 805 attaches the identification number 0 to the sample timing signal (zero cross detection signal) generated immediately after the reference signal Vp1 is generated and attaches the identification numbers 1 to 5 to a series of the sample timing signals subsequently generated. In this way, the section from the zero cross point of each identification number 0 to the zero cross point of the next identification number 0 is detected as the determination object section.

The intake air pressure sampling means 806 samples the intake air pressure P detected by the pressure sensor 12 every time the zero cross point of the rotational angle detection signal which the rotational angle sensor 16 outputs is detected and the sample timing signal is generated.

The determination object variable maximum value arithmetical operation means finds the absolute value of the difference between the intake air pressure Pn-1 sampled one time before and the intake air pressure Pn sampled this time as the determination object variable every time the intake air pressure is sampled and arithmetically operates the maximum value ΔPm in each determination object section of the determination object variable at the time when the inclination of the change in the intake air pressure is negative as the determination object value, thereby permitting the arithmetically operated determination object value to be stored in the storage means 808.

The determination means 809 compares the determination object value found in the determination object section of this time with the determination object value stored in the storage means 808 found in the determination object section which is one section before and determines each determination object section as the section where the intake stroke and the compression stroke are performed at the specified cylinder when the determination object value corresponding to the specified cylinder found in each determination object section is smaller than the determination object value corresponding to the same cylinder found in the determination object section which is one section before each determination object section.

In the above described example, the zero cross point at the time when the rotational angle detection signal Vg shown in FIG. 3B moves from the negative half-wave to the positive half-wave is taken as the sampling position. However, the zero cross point at the time when the rotational angle detection signal moves from the positive half-wave to the negative half-wave may be taken as the sampling position or all the zero cross points of the rotational angle detection signal may be taken as the sampling position. Further, the rotational angle position to be detected by the positive and negative peak points of the rotational angle detection signal can be taken as the sampling position and both of the zero cross point and the positive and negative peak point can be taken as the sampling position.

When both of the zero cross point and the peak point are taken as the sampling position, sampling intervals can be made shorter so that the pressure change inside the intake pipe can be more precisely detected so as to accurately perform the stroke determination.

In the above described example, a generating coil inside the magneto generator to be driven by the combustion engine is used as the rotational angle sensor. However, the rotational angle sensor may be a sensor which generates the signal including the information of a plurality of rotational angle positions of the internal combustion engine, and a signal generator for generating a pulse signal every time the internal combustion engine makes a predetermined angle rotation can also be used. In this case, the intake air pressure sampling means is constituted such that at least either one of the rotational angle position of the crank shaft corresponding to the rising of the pulse signal which the signal generator generates and the rotational angle position of the crank shaft corresponding to the falling of the pulse signal is taken as the sampling position.

As the signal generator for generating the pulse every time the crank shaft makes a predetermined angle rotation, for example, a generator (gear sensor) for detecting the teeth of a ring gear which is attached to the outer periphery of the flywheel in order to engage with the pinion gear to be driven by a motor for starting the combustion engine and generating a pulse signal can be used. The rotary encoder to be generally used for detecting the rotational angle position of the rotating member can also be used as the above described rotational angle sensor.

When the encoder is used as the rotational angle sensor, both of the rotational angle detection pulse and the reference pulse are generated from the encoder, so that the encoder can be permitted to serve both as the rotational angle sensor and the reference signal generator. In order to permit both of the rotational angle detection pulse and the reference pulse to be generated from the encoder, for example, generating intervals of a series of pulses to be generated from the encoder every time the internal combustion engine makes a minute angle rotation are made unequal intervals in part so that the ECU may be permitted to recognize the pulses generated at equal angle intervals as the rotational angle detection pulses and the pulses generated at unequal intervals as the reference pulses.

Further, the width of one pulse of the series of pulses to be generated from the encoder every time the internal combustion engine makes a minute angle rotation is made different from the width of the other pulses so that a series of pulses having an equal pulse width may be permitted to be recognized as the rotational angle detection pulses and one pulse having a different pulse width from the other pulses may be permitted to be recognized as the reference pulse.

Next, in the control system shown in FIG. 1 and FIG. 2, the functional realizing means other than the stroke determination means to be realized by the ECU 8 will be described. The rotational speed arithmetical operation means 803 is provided in order to detect the rotational speed of the internal combustion engine at each instantaneous time, and this rotational speed arithmetical operation means arithmetically operates the rotational speed of the combustion engine from the generating intervals of the pulses which the pulser 15 outputs.

Injection amount arithmetical operation means 810 arithmetically operates the outputs of various sensors such as the intake air temperatures detected by the intake air temperature sensor 13, the coolant temperatures or the like of the combustion engine detected by the water temperature sensor 14 and the fuel injection amount for control conditions such as rotational speed or the like of the combustion engine arithmetically operated by the rotational speed arithmetical operation means 803. When the injection amount is arithmetically operated, other conditions such as the atmospheric pressure or the like are sometimes taken as control conditions.

Injection timing arithmetical operation means 811 arithmetically operates the injection timing (time to start the injection of the fuel) in each rotational speed which is arithmetically operated by the rotational speed arithmetical operation means 803 in the form of the time required for the crank shaft to rotate from the reference position θo to the rotational angle position corresponding to the injection timing, and feeds the arithmetically operated injection timing to injection command generating means 812.

The injection command generating means 812 arithmetically operates the injection timing necessary for permitting the amount of the fuel arithmetically operated by the injection amount arithmetical operation means 810 to be injected from the injector and gives the injection command signal having a signal width equivalent to the arithmetically operated injection timing to the injector driving circuit 801 when a predetermined injection timing arithmetically operated by the injection timing arithmetical operation means is detected based on the rotational angle information to be obtained from the output of the reference signal generator 15.

The injector driving circuit 801 feeds the driving current to the injector 3 while the injection command signal is generated and permits the fuel to be injected from the injector.

Ignition timing arithmetical operation means 813 arithmetically operates the ignition timing of the internal combustion engine for the rotational speed arithmetically operated by the rotational speed arithmetical operation means 803.

Ignition command generating means 814 starts the detection of the ignition timing arithmetically operated by the ignition timing arithmetical operation means when, for example, the pulser 15 generates a specified pulse, and gives the ignition command signal to an ignition coil primary current control circuit 802 when the arithmetically operated ignition timing of the combustion engine is detected.

The primary current control circuit 802 permits a sudden change to be generated for the primary current of the ignition coil IG when the ignition command signal is given and induces high voltage for use of ignition to a secondary coil of the ignition coil. Since this high voltage for use of ignition is applied to an ignition plug 2, a spark discharge is occurred at the ignition plug 2, thereby igniting the combustion engine.

Figure 4:
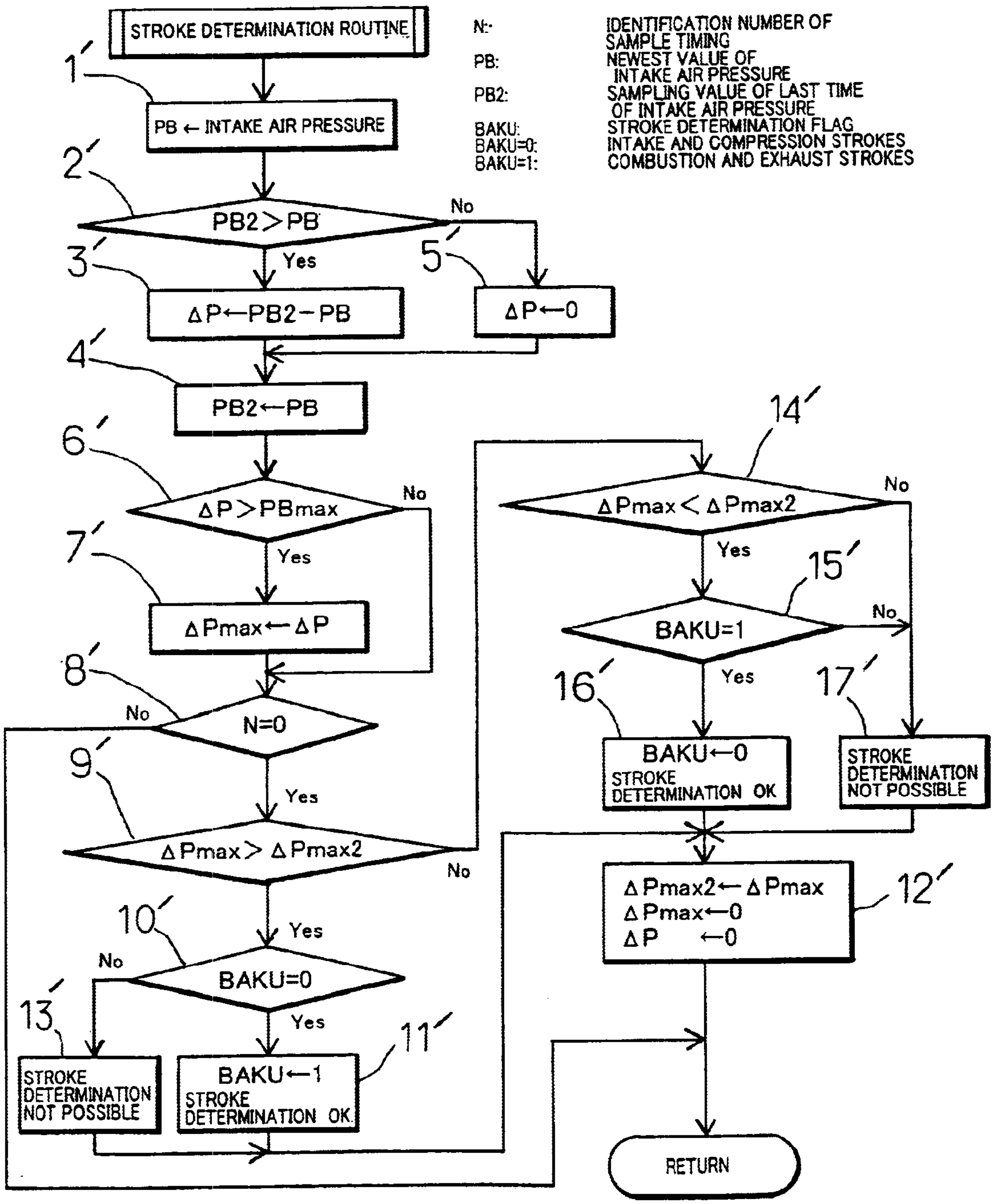
FIG. 4 is a flowchart showing one example of an algorism of a program which a microcomputer of ECU implements in order to constitute a stroke determination device in the system shown in FIG. 1.

One example of the algorism of the stroke determination routine of the program, which the microcomputer of the ECU 8 is permitted to implement in order to constitute the stroke determination device shown in FIG. 2, is shown in FIG. 4.

The stroke determination routine shown in FIG. 4 is implemented for every constant time (for example, every 2 msec). In this routine, first, in step 1', the intake air pressure sampled this time is read as PB and, in step 2', it is determined whether or not the intake air pressure PB sampled this time is smaller than the intake air pressure PB2 sampled at the last time (determined whether or not the inclination of the intake air pressure is negative). As a result, when it is determined that the intake air pressure PB sampled this time is smaller than the intake air pressure PB2 sampled at the last time (the inclination of the intake air pressure is negative), the process advances to step 3', wherein the intake air pressure PB sampled this time is deducted from the intake air pressure PB2 sampled at the last time and the result of the arithmetical operation is stored as the present value ΔP of the determination object variable and, after that, the process advances to step 4'.

In step 2', when it is determined that the intake air pressure PB sampled this time is not smaller than the intake air pressure PB2 sampled at the last time (the inclination of the intake air pressure is zero or positive), the determination object variable ΔP is set as 0 in step 5' and, then, the process advances to step 4'.

In step 4', the intake air pressure PB sampled this time is taken as the intake air pressure PB2 sampled at the last time in preparation for the arithmetical operation of the next determination object variable, and the process advances to step 6'. In step 6', the present value ΔP of the determination object variable stored is compared with the maximum value ΔPmax of the determination object variable found so far in the same determination object section and, when it is determined that ΔP>ΔPmax, the process advances to step 7', wherein the determination object variable ΔP found this time is taken as a new maximum value ΔPmax of the determination object variable. Subsequently in step 8', it is determined whether or not the identification number N of the zero cross point of the rotational angle detection signal is 0. As a result, when the identification number N is not 0, the process advances to step 9' and compares the maximum value (the determination object value) ΔPmax of the determination object variable with the determination object value ΔPmax2 found in the determination object section which is one section before. As a result, when it is determined that ΔPmax>ΔPmax2, the process advances to step 10', wherein it is determined whether or not a stroke determination flag BAKU is 0 (determined whether or not the determination object section just before is the section where the intake and compression strokes are performed). In this determination process, when it is determined that the stroke determination flag BAKU is 0, the process advances to step 11', wherein the stroke determination flag BAKU is set to 1 and it is determined that the next determination object section is the section where the combustion and exhaust strokes are performed. Subsequently in step 12', the determination object value ΔPmax found in the determination object section just before is set to ΔPmax2 in preparation for the stroke determination at the next determination object section and both of the determination object value ΔPmax and the present value ΔP of the determination object variable are reset to 0 and, after that, the process returns to the main routine.

In step 8', when it is determined not to be BAKU=0 (determined that BAKU=1), the determination result thereof is contradictory and, therefore, the process moves to step 12' with the determination deemed not possible.

In step 9', when it is determined not to be ΔPmax>ΔPmax2, the process advances to step 14', wherein it is determined whether or not the relationship of ΔPmax<ΔPmax2 is established and, when it is determined that this relationship is established, the process advances to step 15', wherein it is determined whether or not the stroke determination flag BAKU is 1. As a result, when BAKU=1 (the determination object section just before is determined to be the section where the combustion and exhaust strokes are performed), the process advances to step 16', wherein it is decided that BAKU=0 and the next determination object section is determined to be the section where the intake and compression strokes are performed and, after that, the process moves to step, 12'.

In step 14', when it is determined that ΔPmax≧ΔPmax2, and, in step 15', when it is determined that BAKU=0, the determination results thereof are contradictory and, therefore, the process moves to step 12' with the determination deemed not possible.

In the above described example, the intake air pressure sampling means is constituted such that the intake air pressure, in which the change in the stroke to be performed by the specified cylinder by step 1' of FIG. 4 is reflected, of the internal combustion engine is sampled every time the sample timing signal is generated.

The absolute value of the difference between the intake air pressure sampled one time before and the intake air pressure sampled this time is found as the determination object variable every time the intake air pressure is sampled by steps 2' to 7', and the determination object variable maximum value arithmetical operation means is constituted such that the maximum value in each determination object section of the determination object variable at the time when the inclination of the change in the intake air pressure is negative is found as the determination object value, and the determination object section detection means is comprised of step 8'. Further, the determination means is constituted such that, when the determination object value in each determination object section found by the determination object variable maximum value arithmetical operation means by steps 9' to 17' is larger than the determination object value found in the determination object section which is one section before each determination object section, each determination object section is determined to be the section where the intake stroke and the compression stroke are performed at the specified cylinder.

In the above described example, with the maximum value of the inclination of the intake air pressure in the process of the absolute value of the intake air pressure being increased as the determination object value, the determination object values detected in each determination object section are compared so as to perform the determination of the stroke. However, by using the above described characteristic b observed in the change in the intake air pressure (the characteristic that, in the section of one rotation where the intake and compression strokes are performed, the cumulative value of the inclination of the change in the intake air pressure infallibly becomes larger than the cumulative value of the inclination of the change in the intake air pressure in the section of one rotation where the combustion and exhaust strokes are performed), the determination of the stroke can be performed.

That is, as shown in FIG. 5, the difference between the intake air pressure sampled one time before and the intake air pressure sampled this time is found as determination object variables ΔP0, ΔP1, . . . ΔP5 every time the intake air pressure is sampled and, at the same time, the cumulative value of the determination object variable found in each determination object section is found as determination object value ΔPsum and, when the determination object value ΔPsum found in each determination object section is larger than the determination object value ΔPsum2 found in each determination object section which is one section before each determination object section, each determination object section can be determined to be the section where the intake and compression strokes are performed at the specified cylinder.

Assuming that the identification number which identifies the sample timing is N and the intake air pressure sampled by the sample timing of the identification number N is PN (N=0, 1, 2, . . . 5), the above described ΔP0 to ΔP5 and the determination object value ΔPsum can be given by the following equations:

When it is not N=0 and yet PN−1≧PN:

$$\Delta PN-1=PN-1-PN \quad (1)$$

When it is N=0 and yet P5≧P0:

$$\Delta P5=P5-P0 \quad (2)$$

When it is not N=0 and yet PN−1<PN:

$$\Delta PN-1=0 \quad (3)$$

When it is N=0 and yet P5<P0:

$$\Delta P5=0 \quad (4)$$

$$\Delta P\text{sum}=\Delta P0+\Delta P1+\Delta P2+\Delta P3+\Delta P4+\Delta P5 \quad (5)$$

When the intake air pressure sampled at the last time is equal to the intake air pressure sampled this time and when the inclination of the change in the intake air pressure is positive (the absolute value of the intake air pressure is increasing), the determination object variable is taken as ΔP=0.

In the example shown in FIG. 5, the determination object variables ΔP2 to ΔP5 to be found in the section A become zero, respectively, and the determination object variables ΔP0, ΔP2, ΔP3 and ΔP5 to be found in the section B become zero, respectively.

Figure 6:
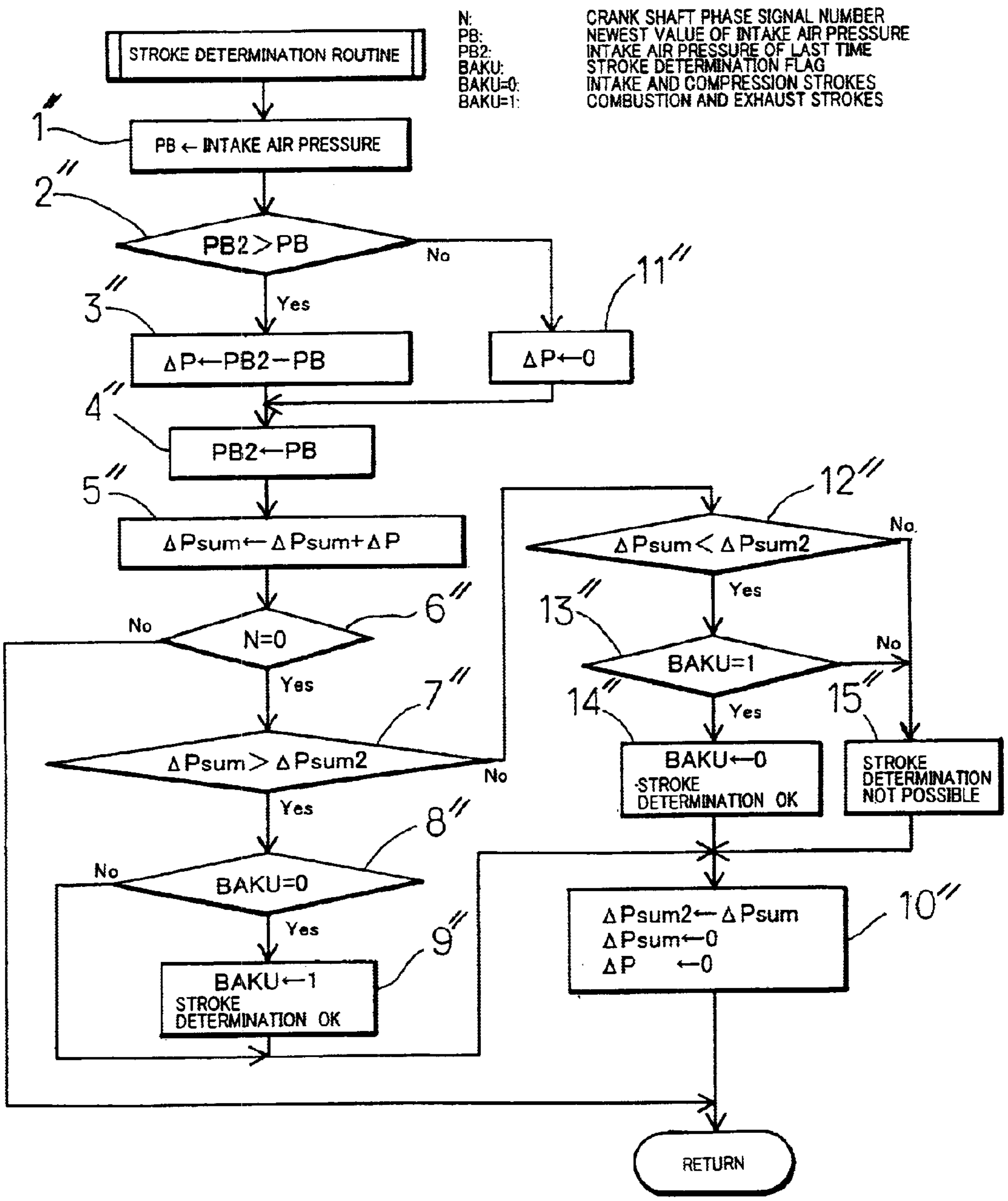
FIG. 6 is a flowchart showing one example of the algorism of the program which the microcomputer of the ECU implements in the second embodiment according to the present invention.

As described above, in the case where the determination of the stroke is performed by using the cumulative value of the determination object variable showing the inclination of the intake air pressure, the flowchart showing one example of the algorism of the stroke determination routine of the program which the microcomputer of the ECU 8 is permitted to implement was shown in FIG. 6.

In the example of FIG. 6, the intake air pressure sampled in step 1" is read as PB and, in step 2", the sampling value PB of this time of the intake air pressure is compared with the sampling value PB2 of the last time. As a result, when PB2>PB, the process advances to step 3", wherein PB2−PB is taken as the present value ΔP of the determination object variable and, in step 4", wherein PB is taken as the sampling value PB2 of the last time. Subsequently in step 5", the cumulative value ΔPsum of the determination object variable previously found is added to the present value ΔP of the determination object variable so that the cumulative value (the determination object value) ΔPsum in the determination object section of this time is arithmetically operated.

Subsequently in step 6", it is determined whether or not the identification number N of the sample timing is 0 and, when it is not N=0, the process returns to the main routine without doing anything. When N=0, the process advances to step 7", wherein ΔPsum is compared with the determination object value ΔPsum2 found in the determination object section which is one section before and, when ΔPsum>ΔPsum2, it is determined whether or not the stroke determination flag BAKU is 0. As a result, when BAKU=0, the process advances to step 9", wherein the stroke determination flag BAKU is set to 1 and the next determination object section is determined to be the section where the combustion and exhaust strokes are performed and, after that, the process advances to step 10". In step 8", when it is determined not to be BAKU=0, the process moves to step 10" without determining that BAKU=1.

In step 10", the determination object value ΔPsum2 is replaced by the determination object value ΔPsum arithmetically operated in the determination object section of this time in preparation for determination at the next determination object section, and, at the same time, the present value ΔPsum of the determination object value and the present value ΔP of the determination object variable are set to 0 and, after that, the process returns to the main routine.

In step 7", when it is determined not to be ΔPsum>ΔPsum2, the process advances to step 12" wherein it is determined whether or not ΔPsum<ΔPsum2 is established and, as a result, when it is determined that ΔPsum<ΔPsum2 is established, the process advances to step 13", wherein it is determined whether or not the stroke determination flag BAKU is 1. As a result, when the stroke determination flag BAKU is determined to be 1, in step 14", the stroke determination flag BAKU is set to 0 and the next determination object section is determined to be the section where the intake and compression strokes are performed and, after that, the process moves to the above described step 10".

When, in step 12", the establishment of the relationship of ΔPsum<ΔPsum2 is denied and when, in step 13", it is determined not to be BAKU=1, the results thereof are contradictory and, therefore, in step 15", the determination of the stroke is deemed not possible and, after that, the process moves to step 10".

In the example shown in FIG. 6, the difference between the intake air pressure sampled one time before and the intake air pressure sampled this time is found as the determination object variable every time the intake air pressure is sampled by steps 1" to 5", and the determination object variable cumulative value arithmetical operation means is constituted, wherein the cumulative value of the determination object variable found in each determination object section is found as the determination object value. Further, the determination means is constituted, wherein, when the above described determination object value found in each determination object section is larger than the determination object value found in the determination object section which is one section before each determination object section by steps 6" to 15", each determination object section is determined to be the section where the intake stroke and the compression stroke are performed at the specified cylinder (the next determination object section is determined to be the section where the combustion and exhaust strokes are performed).

In the example shown in FIG. 6, the determination of the stroke is performed from the cumulative value of the inclination of the change in the intake air pressure. However, the determination of the stroke can be performed also from the average value of the inclination of the change in the intake air pressure by the almost same algorism as the algorism shown in FIG. 6. When the determination of the stroke is performed by using the average value of the inclination of the change in the intake air pressure, instead of arithmetically operating the cumulative value ΔPsum of the determination object variable in step 5" of FIG. 6, the average value ΔPav of the determination object variable ΔP expressing the inclination of the intake air pressure is arithmetically operated and, in steps 7" and 12", the average value ΔPav arithmetically operated in the determination object section just before may be compared with the average value ΔPav arithmetically operated in the determination object section which is one section before.

In the above described example, the zero cross point of the rotational angle detection signal to be detected immediately after the reference signal Vp1 is generated is permitted to match the top dead point of the piston of the combustion engine. However, the generating position of the reference signal Vp1 is permitted to match the top dead point of the piston of the combustion engine so that the section from the generating position of each reference signal Vp1 to the generating position of the next reference signal may be taken as the determination object section.

In the above described example, though the zero cross point of the alternating current voltage waveform which the rotational angle sensor 16 outputs is used as the sampling position, a series of pulse signals which an oscillator generates at a constant cycle is used as the sample timing signals so that the intake air pressure may be sampled every time each sample timing signal is generated.

In this way, when the sample timing is decided by the sample timing signal to be generated at a constant cycle (time intervals), the reference signal generator 15 only may be provided as a mechanical sensor and the rotational angle sensor is not required and, therefore, this can contribute to simplifying the constitution. Further, in the example shown in FIG. 1, since the generating coil inside the magneto generator 7 is not required to be used as the rotational angle sensor 16, the load drivable by the magneto generator 7 can be increased. Further, when the load to be driven by the magneto generator 7 is permitted to remain the same, the magneto generator can be minimized.

In the example shown in FIG. 1, the pressure sensor 12 is provided in the vicinity of the throttle valve 1*m*. However, when a surge tank for absorbing fluctuation of the intake air pressure is provided in the intake pipe, it is hard to appear the pressure fluctuation followed by the stroke change of the combustion engine in the intake air pressure detected in the vicinity of the throttle valve 1*m* and, therefore, it is desirable to detect the intake air pressure at a portion between the surge tank and the intake port of the combustion engine.

In the above described example, though a single cylinder internal combustion engine was cited as an example, in the case of a multi-cylinder internal combustion engine, the minimum value of the intake air pressure, in which the stroke change of a specified one cylinder is reflected, is found so as to determine the stroke of the specified cylinder, while the stroke of the other cylinder may be determined from a mechanical angle shift for the stroke change of the specified cylinder.

In the multi-cylinder internal combustion engine, when the intake pipe is independently provided for each cylinder, the pressure inside the intake pipe provided for the specified cylinder is detected so that the intake air pressure, in which the change of the stroke to be performed by the specified cylinder is reflected, can be detected.

In the multi-cylinder internal combustion engine, when the intake pipes of a plurality of cylinders are collectively connected to one intake pipe, the intake air pressure is detected, for example, in the vicinity of the intake port of the specified cylinder so that the intake air pressure, in which the change of the stroke to be performed by the specified cylinder is reflected, can be detected.

As described above, according to the present invention, the minimum value of the intake air pressure in each determination object section is found so that, when the minimum value of the intake air pressure found in each determination object section is smaller than the minimum value of the intake air pressure found in the determination object section which is one section before, each determination object section is determined to be the section where the intake stroke and the compression stroke are performed and, therefore, similar to the case where the throttle valve is put into a fully opened state, even when the intake air pressure minutely pulsates, the stroke determination can be performed and, even in whichever state the combustion engine is placed, the stroke determination can be adequately performed.

What is claimed is:

1. A stroke determination method of a four cycle internal combustion engine, in which a section where a crank shaft of the four cycle internal combustion engine makes one rotation from a position corresponding to a top dead point of a piston of a specified cylinder is taken as a determination object section and each determination object section is determined whether a section where an intake stroke and a compression stroke are performed at said specified cylinder or a section where a combustion stroke and an exhaust stroke are performed, wherein an intake air pressure, in which a stroke change to be performed by said specified cylinder is reflected, of said internal combustion engine is detected, with an amount including information of the inclination of the change in said intake air pressure taken as a determination object variable, the amount in which magnitude of the determination object variable in each determination object section is reflected is found as a determination object value, and when said determination object value found in each determination object section is larger than the determination object value found in the determination object section which is one section before each determination object section, each determination object section is determined to be the section where the intake stroke and the compression stroke are performed at said specified cylinder.

2. A stroke determination method of a four cycle internal combustion engine according to claim 1, wherein said determination object value is a value of said determination object variable at the time when the inclination of the change in the intake air pressure becomes the maximum in the process of an absolute value of said intake air pressure being increased in each determination object section.

3. A stroke determination method of a four cycle internal combustion engine according to claim 1, wherein said determination object variable is an inclination for a crank angle of said intake air pressure, and said determination object value is the maximum value of said determination object variable in the process of the absolute value of said intake air pressure being increased in each determination object section.

4. A stroke determination method of a four cycle internal combustion engine according to claim 1, wherein said determination object variable is an inclination for the time of said intake air pressure, and said determination object value is the maximum value of said determination object variable in the process of the absolute value of said intake air pressure being increased in each determination object section.

5. A stroke determination method of a four cycle internal combustion engine according to claim 1, wherein said determination object variable is an amount of change per unit hour of said intake air pressure, and said determination object value is said determination object variable at the time when the inclination for the time of said intake air pressure in the process of the absolute value of said intake air pressure being increased becomes the maximum.

6. A stroke determination method of a four cycle internal combustion engine according to claim 1, wherein said determination object variable is an amount of change in said intake air pressure which is generated during a unit angle rotation which said crank shaft makes, and said determination object value is said determination object variable at the time when the inclination for the crank angle of said intake air pressure becomes the maximum in the process of the absolute value of said intake air pressure being increased.

7. A stroke determination method of a four cycle internal combustion engine according to claim 1, wherein said determination object value is a cumulative value of said determination object variable in each determination object section.

8. A stroke determination method of a four cycle internal combustion engine according to claim 1, wherein said determination object variable is the inclination for the crank angle of said intake air pressure, and said determination object value is the cumulative value of said determination object variable in each determination object section.

9. A stroke determination method of a four cycle internal combustion engine according to claim 1, wherein said determination object variable is the inclination for the time of said intake air pressure, and said determination object value is the cumulative value of said determination object variable in each determination object section.

10. A stroke determination method of a four cycle internal combustion engine according to claim 1, wherein said determination object variable is the amount of change per unit hour of said intake air pressure, and said determination object value is the cumulative value of said determination object variable in each determination object section.

11. A stroke determination method of a four cycle internal combustion engine according to claim 1, wherein said determination object variable is the amount of change in said intake air pressure which is generated during the unit angle rotation which said crank shaft makes, and wherein said determination object value is the cumulative value of said determination object variable in each determination object section.

12. A stroke determination method of a four cycle internal combustion engine according to claim 1, wherein said determination object value is an average value of said determination object variable in each determination object section.

13. A stroke determination method of a four cycle internal combustion engine according to claim 1, wherein said determination object variable is the inclination for the crank angle of said intake air pressure, and said determination object value is an average value of said determination object variable in each determination object section.

14. A stroke determination method of a four cycle internal combustion engine according to claim 1, wherein said determination object variable is the inclination for the time of said intake air pressure, and said determination object value is the average value of said determination object variable in each determination object section.

15. A stroke determination method of a four cycle internal combustion engine according to claim 1, wherein said determination object variable is the amount of change per unit hour of said intake air pressure, and said determination object value is the average value of said determination object variable in each determination object section.

16. A stroke determination method of a four cycle internal combustion engine according to claim 1, wherein said determination object variable is the amount of change in said intake air pressure which is generated during the unit angle rotation which said crank shaft makes, and said determination object value is the average value of said determination object variable in each determination object section.

17. A stroke determination method of a four cycle internal combustion engine, in which a section where a crank shaft of a four cycle internal combustion engine makes one rotation from a position corresponding to a top dead point of a piston of a specified cylinder is taken as a determination object section and each determination object section is determined whether said determination object section is a section where an intake stroke and a compression stroke are performed at said specified cylinder or a section where a combustion stroke and an exhaust stroke are performed, comprising the steps of:

providing sample timing signal generating means for generating a sample timing signal plural times in each determination object section and a reference signal generator for generating a reference signal at the reference rotational angle position set at a specified rotational angle position of the crank shaft of said internal combustion engine;

sampling an intake air pressure, in which a change in a stroke to be performed by said specified cylinder is reflected every time when said sample timing signal is generated, of said internal combustion engine;

detecting each determination object section based on said reference signal;

finding a difference between an intake air pressure sampled one time before and an intake air pressure sampled this time as a determination object variable every time when said intake air pressure is sampled so that a maximum value in each determination object section of the determination object variable at the time when an inclination of the intake air pressure is negative is found as a determination object value; and determining each determination object section to be the section where the intake stroke and the compression stroke are performed at said specified cylinder, when said determination object value found in each determination object section is larger than the determination object value found in the determination object section which is one section before each determination object section.

18. A stroke determination method of a four cycle internal combustion engine according to claim 17, wherein said sample timing signal generating means comprises:

a rotational angle sensor for generating a rotational angle detection signal including information of a plurality of different rotational angle positions of the crank shaft of said internal combustion engine as information of a plurality of sampling positions, respectively; and sampling position detection means for detecting said plurality of sampling positions from said rotational angle detection signal, respectively and generating said sample timing signal at each sampling position.

19. A stroke determination method of a four cycle internal combustion engine according to claim 17, wherein said sample timing signal generating means comprises an oscillator for generating said sample timing signal at a constant cycle.

20. A stroke determination method of a four cycle internal combustion engine, in which a section where a crank shaft of the four cycle internal combustion engine makes one rotation from a position corresponding to a top dead point of a piston of a specified cylinder is taken as a determination object section and each determination object section is determined whether said determination object section is a section where an intake stroke and a compression stroke are performed at said specified cylinder or a section where a combustion stroke and an exhaust stroke are performed, comprising the steps of:

providing sample timing signal generating means for generating a sample timing signal plural times in each determination object section and a reference signal generator for generating a reference signal at the reference rotational angle position set at a specified rotational angle position of the crank shaft of said internal combustion engine;

sampling an intake air pressure, in which a change in a stroke to be performed by said specified cylinder is reflected, of said internal combustion engine every time when said sample timing signal is generated;

detecting each determination object section based on said reference signal;

finding a difference between an intake air pressure sampled one time before and an intake air pressure sampled this time as a determination object variable every time said intake air pressure is sampled and, at the same time, finding a cumulative value of the determination object variable found in each determination object section as the determination object value; and determining each determination object section to be the section where the intake stroke and the compression stroke are performed at said specified cylinder when said determination object value found in each determination object section is larger than the determination object value found in the determination object section which is one section before each determination object section.

21. A stroke determination method of a four cycle internal combustion engine according to claim 20, wherein said sample timing signal generating means comprises:

a rotational angle sensor for generating the rotational angle detection signal including information of a plurality of different rotational angle positions of the crank shaft of said internal combustion engine as information of a plurality of sampling positions, respectively; and sampling position detection means for detecting said plurality of sampling positions from said rotational angle detection signal, respectively and generating said sample timing signal at each sampling position.

22. A stroke determination method of a four cycle internal combustion engine according to claim 20, wherein said sample timing signal generating means comprises an oscillator for generating said sample timing signal at a constant cycle.

23. A stroke determination method of a four cycle internal combustion engine, in which a section where a crank shaft of the four cycle internal combustion engine makes one rotation from a position corresponding to the top dead point of a piston of a specified cylinder is taken as a determination object section and each determination object section is determined whether said determination object section is a section where an intake stroke and a compression stroke are performed at said specified cylinder or a section where a combustion stroke and an exhaust stroke are performed, comprising the steps of:

providing sample timing signal generating means for generating a sample timing signal plural times in each determination object section and a reference signal generator for generating a reference signal at the reference rotational angle position set at a specified rotational angle position of the crank shaft of said internal combustion engine;

sampling an intake air pressure, in which a change in a stroke to be performed by said specified cylinder is reflected, of said internal combustion engine every time when said sample timing signal is generated;

detecting each determination object section based on said reference signal;

finding a difference between an intake air pressure sampled one time before and an intake air pressure sampled this time as a determination object variable every time said intake air pressure is sampled and, at the same time, finding an average value of the determination object variable found in each determination object section as the determination object value; and determining each determination object section to be the section where the intake stroke and the compression stroke are performed at the specified cylinder, when said determination object value found in each determination object section is larger than the determination object value found in the determination object section which is one section before each determination object section.

24. A stroke determination method of the four cycle internal combustion engine according to claim 23, wherein said sample timing signal generating means comprises:

a rotational angle sensor for generating the rotational angle detection signal including information of a plurality of different rotational angle positions of the crank shaft of said internal combustion engine as information of a plurality of sampling positions, respectively; and sampling position detection means for detecting said plurality of sampling positions from said rotational angle detection signal, respectively and generating said sample timing signal at each sampling position.

25. A stroke determination method of a four cycle internal combustion engine according to claim 23, wherein said sample timing signal generating means comprises the oscillator for generating said sample timing signal at a constant cycle.

26. A stroke determination device of a four cycle internal combustion engine, in which a section where a crank shaft of the four cycle internal combustion engine makes one rotation from a position corresponding to the top dead point of a piston of a specified cylinder is taken as a determination object section and each determination object section is determined whether said determination object section is a section where an intake stroke and a compression stroke are performed at said specified cylinder or a section where a combustion stroke and an exhaust stroke are performed, comprising:

sample timing signal generating means for generating a sample timing signal plural times in each determination object section;

a reference signal generator for generating a reference signal at the reference rotational angle position set at a specified rotational angle position of the crank shaft of said internal combustion engine;

determination object section detection means for detecting each determination object section based on the generating position of said reference signal;

intake air pressure sampling means for sampling the intake air pressure, in which the change in the stroke to be performed by said specified cylinder is reflected, of said internal combustion engine every time when the sample timing signal is generated;

determination object variable maximum value arithmetical operation means for finding the absolute value of the difference between the intake air pressure sampled one time before and the intake air pressure sampled this time as the determination object variable every time when the intake air pressure is sampled and, at the same time, finding the maximum value in each determination object section of said determination object variable at the time when the inclination of the change in said intake air pressure is negative as the determination object value; and determination means for determining each determination object section to be the section where the intake stroke and the compression stroke are performed at said specified cylinder when the determination object value in each determination object section found by said determination object variable maximum value arithmetical operation means is larger than the determination object value found in the determination object section which is one section before each determination object section.

27. A stroke determination device of a four cycle internal combustion engine according to claim 26, wherein said sample timing signal generating means comprises:

a rotational angle sensor for generating the rotational angle detection signal including information of a plurality of different rotational angle positions of the crank shaft of said internal combustion engine as information of a plurality of sampling positions, respectively; and sampling position detection means for detecting said plurality of sampling positions from said rotational angle detection signal, respectively and generating said sample timing signal at each sampling position.

28. A stroke determination device of a four cycle internal combustion engine according to claim 26, wherein said sample timing signal generating means comprises the oscillator for generating said sample timing signal at a constant cycle.

29. A stroke determination device of a four cycle internal combustion engine, in which a section where a crank shaft of the four cycle internal combustion engine makes one rotation from a position corresponding to the top dead point of a piston of a specified cylinder is taken as a determination object section and each determination object section is determined whether said determination object section is a section where an intake stroke and a compression stroke are performed at said specified cylinder or a section where a combustion stroke and an exhaust stroke are performed, comprising:

sample timing signal generating means for generating a sample timing signal plural times in each determination object section;

a reference signal generator for generating a reference signal at the reference rotational angle position set at a specified rotational angle position of the crank shaft of said internal combustion engine;

determination object section detection means for detecting each determination object section based on the generating position of said reference signal;

intake air pressure sampling means for sampling the intake air pressure, in which the change in the stroke to be performed by said specified cylinder is reflected, of said internal combustion engine every time when the sample timing signal is generated;

determination object variable cumulative value arithmetical operation means for finding the difference between the intake air pressure sampled one time before and the intake air pressure sampled this time as the determination object variable every time when the intake air pressure is sampled and, at the same time, finding the cumulative value of the determination object variable found in each determination object section as the determination object value; and determination means for determining each determination object section to be the section where the intake stroke and the compression stroke are performed at the specified cylinder when said determination object value found in each determination object section is larger than the determination object value found in the determination object section which is one section before each determination object section.

30. A stroke determination device of the four cycle internal combustion engine according to claim 29, wherein said sample timing signal generating means comprises:

a rotational angle sensor for generating the rotational angle detection signal including information of a plurality of different rotational angle positions of the crank shaft of said internal combustion engine as information of a plurality of sampling positions, respectively; and sampling position detection means for detecting said plurality of sampling positions from said rotational angle detection signal, respectively and generating said sample timing signal at each sampling position.

31. A stroke determination device of a four cycle internal combustion engine according to claim 29, wherein said sample timing signal generating means comprises the oscillator for generating said sample timing signal at a constant cycle.

32. A stroke determination device of a four cycle internal combustion engine, in which a section where a crank shaft of the four cycle internal combustion engine makes one rotation from a position corresponding to the top dead point of a piston of a specified cylinder is taken as a determination object section and each determination object section is determined whether said determination object section is a section where an intake stroke and a compression stroke are performed at said specified cylinder or a section where a combustion stroke and an exhaust stroke are performed, comprising:

sample timing signal generating means for generating a sample timing signal plural times in each determination object section;

a reference signal generator for generating a reference signal at the reference rotational angle position set at a specified rotational angle position of the crank shaft of said internal combustion engine;

determination object section detection means for detecting each determination object section based on the generating position of said reference signal;

intake air pressure sampling means for sampling the intake air pressure, in which the change in the stroke to be performed by said specified cylinder is reflected, of said internal combustion engine every time when the sample timing signal is generated;

determination object variable average value arithmetical operation means for finding the difference between the intake air pressure sampled one time before and the intake air pressure sampled this time as the determination object variable every time when the intake air pressure is sampled and, at the same time, finding the average value of the determination object variable found in each determination object section as the determination object value; and determination means for determining each determination object section to be the section where the intake stroke and the compression stroke are performed at the specified cylinder when said determination object value found in each determination object section is larger than the determination object value found in the determination object section which is one section before each determination object section.

33. A stroke determination device of a four cycle internal combustion engine according to claim 32, wherein said sample timing signal generating means comprises:

a rotational angle sensor for generating the rotational angle detection signal including information of a plurality of different rotational angle positions of the crank shaft of said internal combustion engine as information of a plurality of sampling positions, respectively; and sampling position detection means for detecting said plurality of sampling positions from said rotational angle detection signal, respectively and generating said sample timing signal at each sampling position.

34. A stroke determination device of a four cycle internal combustion engine according to claim 32, wherein said sample timing signal generating means comprises the oscillator for generating said sample timing signal at a constant cycle.

* * * * *